United States Patent [19]
Hish

[11] 3,842,528
[45] Oct. 22, 1974

[54] FISHING LINE WEIGHTS

[76] Inventor: Ralph Riley Hish, 129 Spruce St., Wood Dale, Ill. 60191

[22] Filed: Apr. 30, 1973

[21] Appl. No.: 355,711

[52] U.S. Cl. ............................................ 43/43.13
[51] Int. Cl. .......................................... A01k 95/00
[58] Field of Search ...................... 43/43.13, 43.1

[56] References Cited
UNITED STATES PATENTS

| | | | |
|---|---|---|---|
| 2,225,805 | 12/1940 | Stevermer | 43/43.1 |
| 2,926,452 | 3/1960 | Lewis | 43/43.1 |
| 3,032,912 | 5/1962 | Bengtsson | 43/43.13 |

*Primary Examiner*—Robert Peshock
*Assistant Examiner*—Daniel J. Leach
*Attorney, Agent, or Firm*—James B. Raden

[57] ABSTRACT

Sinker weights for fishing lines are provided which include a solid body with an affixed tail assembly having apertures formed therein. Additionally, the tail assembly may also include tabs associated with the apertures and these tabs may also include apertures therein. The body is designed to present a pointed forward edge in horizontal section as the weight is towed during a trolling operation. These weights are not subject to substantial pivoting or rotation during motion through water and they are designed to move smoothly through the water with minimal resistance. Furthermore, the weights produce vibration induced sound waves which attract fish.

11 Claims, 5 Drawing Figures

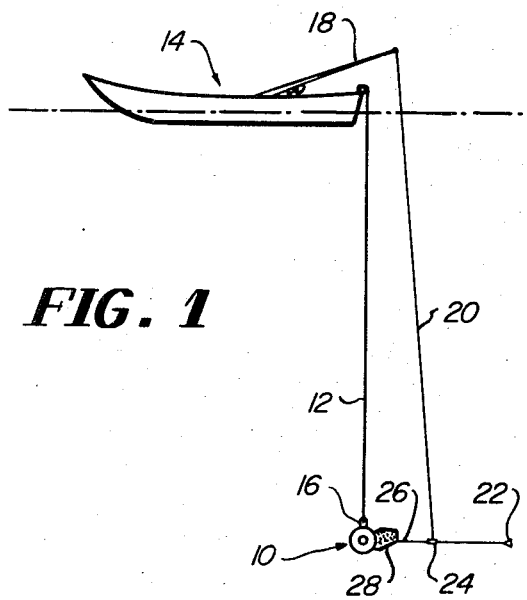
FIG. 1
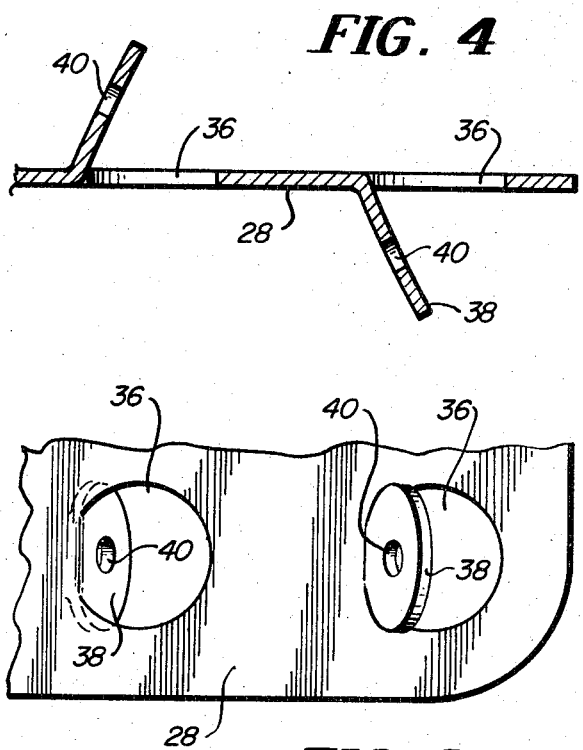
FIG. 4
FIG. 5
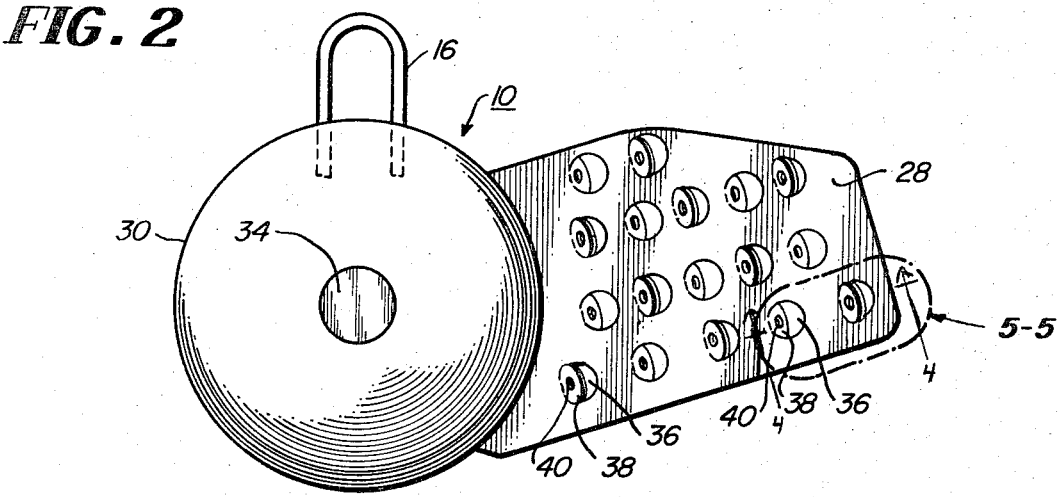
FIG. 2
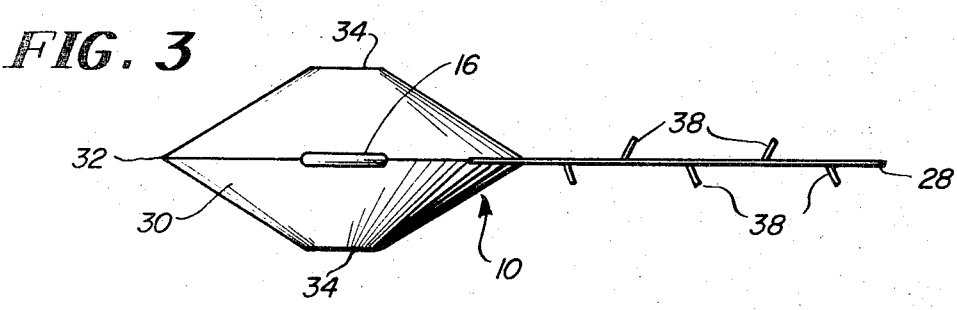
FIG. 3

FISHING LINE WEIGHTS

This invention relates to fishing line sinker weights and more particularly to weights for use in trolling operations.

In standard trolling operations, a trolling weight or sinker is employed to maintain the lure or bait end of a fishing line associated therewith at a desired depth below the surface of the water as the surface vessel from which the line is suspended moves through the water, such movement tending to cause the line to rise. The trolling weight should move smoothly through the water as it is being towed by the vessel and there should be substantially no tendency for the weight to pivot or rotate while moving. If the weight does pivot or rotate to any appreciable extent about its axis, then there is a strong probability that the fishing line associated with the weight will become entangled particularly in situations where a number of fishing lines are suspended from a single vessel. Such entanglements of fishing lines will be recognized as being highly undesirable. However, it has been a continuing problem for the designers of trolling weights to provide a weight which has virtually no tendency to pivot or rotate during a trolling operation and which would thereby eliminate the problem relative to fishing line entanglement caused by the rotation of the weight. Additionally, trolling weights generally have been shaped in a manner such that they present a high degree of resistance as they are towed through water thus creating a problem in providing a smooth motion of the weights through water. Furthermore, prior trolling weights or sinkers have been designed almost solely for the purpose of maintaining the fishing line at a desired depth without providing any substantial fish attracting role. It will be recognized that it would be highly advantageous to provide trolling weights or sinkers having the capability of attracting fish to the fishing line.

SUMMARY OF THE INVENTION

It is therefore, a principal object of the present invention to provide trolling weights or sinkers which are highly stable and are not subject to substantial pivoting or rotation while being towed through the water.

Another primary object is to provide trolling weights or sinkers of a new and improved design which cut through water with only minimal resistance being presented by the leading edge thereof thereby providing extremely smooth motion of the weights through the water.

Another object is to provide trolling weights or sinkers which are adapted to attract fish to the fishing lure or hook associated with the weights. In this regard, it is a related object to provide trolling weights or sinkers which are designed to move smoothly through water and while moving to cause a fish attracting sound wave to be emitted through the water.

To effect these and other objects, features and advantages of the invention, I provide trolling weights or sinkers for installation into standard trolling systems. The weights include means for substantially eliminating the tendency of the weights to rotate or pivot while moving through water and are designed so that the front section of the weights as they move through the water present a tapered edge which cuts through the water thereby promoting efficient, smooth motion of the weight. A further feature of a preferred embodiment of my invention is the provision of means on the weights for causing vibratory disruption of the water as the weights are towed through the water thereby causing sound waves to be emitted which have been found to attract fish.

In one form, a trolling weight of the present invention comprises a heavy body portion and a fixedly attached fin or tail portion. The body and the fin or tail can be constructed as an integral unit or the two portions can be fastened together by any suitable means such as by screw fastening or by embedding the fin in the body while the body is being molded or cast. The body portion comprises a solid member having a generally biconcave shape in horizontal section tapering outwardly from generally pointed edge sections on the periphery of the member to a generally flattened section about the midpoint of the member. This solid member preferably weighs less than about 12 pounds, and most preferably about 7–11 pounds, although the weight of the member can be selected as desired.

Affixed at one edge of the body is a fin or tail assembly having a plurality of apertures formed therein. In one embodiment of my invention, the apertures are formed in the fin or tail assembly by punching holes completely through the fin or tail assembly. However, in a preferred embodiment of my invention, the fin or tail assembly material is displaced outwardly to form an aperture in the assembly with bent tabs or flaps extending outwardly on alternating sides of the fin or tail assembly. In a most preferred embodiment of my invention, apertures are also formed in the surface of the tabs or flaps.

As a result of the construction of the trolling or sinker weights of my invention, I have found that the weights move smoothly through the water during a trolling operation particularly as a consequence of the generally biconcave nature of the body portion of the weight which presents a generally pointed leading edge to the weight as it moves through the water thereby enabling the weight to cut through the fluid medium in a very effective manner. Furthermore, the fin or tail assembly on the body with the apertures therein, and particularly when provided with the accompanying tabs or flaps, acts in a very beneficial manner to stabilize the weight as it moves through the water thereby essentially eliminating the heretofore troublesome problem relative to pivoting or rotation of the weight during movement. In addition, the fin or tail assembly with the accompanying tabs or flaps is designed so that the water flowing around the surface of the generally biconcave body member, as the weight moves through the water, rushes against the protruding tabs or flaps causing the fin or tail assembly to vibrate to a limited extent. This vibratory action of the fin induces a vibratory disruption of the water which causes a sound wave to be emitted. Surprisingly, we have found that this emitted sound wave tends to attract fish in the vicinity of the trolling weight. Thus, in tests which I have conducted, it has been demonstrated that weights of the present invention having apertured fin or tail assemblies with accompanying tabs or flaps attract fish and enable substantially greater catches of fish than is achieved with standard, commercially available trolling weights. Furthermore, in this testing, I have found that when additional apertures are formed in the tabs or flaps, an even more pronounced vibratory action is created and the fish attracting feature of the present trolling weights in enhanced without adversely affecting the stability and the substantial elimination of pivoting or rotation of the weights while in motion.

BRIEF DESCRIPTION OF THE DRAWINGS

FIG. 1 is a schematic view in side elevation of a down rigger trolling weight of the present invention illustrated in a trolling hook-up and showing the manner in which it is used;

FIG. 2 is a side elevational view of the trolling weight shown in FIG. 1;

FIG. 3 is a top plan view of the trolling weight shown in FIGS. 1 and 2;

FIG. 4 is a sectional view of a portion of the fin or tail assembly of the trolling weight taken along line 4—4 of FIG. 2; and FIG. 5 is an exploded view in side elevation of the circled portion of the fin or tail assembly in FIG. 2 indicated as 5—5.

DETAILED DESCRIPTION OF THE DRAWINGS

Shown in FIG. 1 is a trolling weight 10 of the present invention employed in a standard trolling hook-up. In this trolling hook-up, the weight 10 is secured to the end of a trolling line or wire 12 which is suspended from the rear section of a surface vessel 14 by attachment of the trolling line 12 to a hook 16 on the top surface of weight 10. Also, at the rear of the vessel 14 is a fishing rod 18 with a fishing line 20 suspended therefrom. A lure or bait 22 is attached to the free end of line 20 and at an intermediate point along line 20 a conventional, commercially available line release leader 24 is detachably connected to the line 20. The line release leader 24 is fixedly secured to weight 10 by leader line or cable 26 which is attached to fin or tail assembly 28 of weight 10. As a result of this hook-up, the weight 10 acts to retain the fishing line 20 at a desired depth until a fish strikes lure 22. When the fish strikes, the line release leader 24 opens releasing the fishing line 20 from the restraint of weight 10.

The weight 10, as best illustrated in FIGS. 2 and 3, comprises a body portion 30 and the fin or tail assembly 28 which is fixedly attached to body 30 by molding or casting fin 28 into body 30. However, body 30 and assembly 28 may be fixedly attached by any suitable means or may be formed as an integral single piece, if desired. The body 30 is a heavy, solid member constructed of any suitable material such as lead or other appropriate metal, concrete, stone or the like and normally weighs up to about 12 pounds, although it may be of any desired weight. As illustrated in FIG. 2, the body 30 is generally circular in side elevation with a hook 16 affixed thereto for attachment to a trolling line or wire. As shown in FIG. 3, the body 30 tapers generally to a point at the leading edge 32 and is generally biconcave in horizontal section with a flattened mid-section 34. It has been found that this construction of body 30 allows the weight to cut through the water very effectively with minimal resistance to motion presented by the leading or forward edge of the weight as it is towed during a trolling operation.

With regard to fin or tail assembly 28, apertures 36 are formed by any suitable means in the surface thereof as by punching or drilling. In a preferred embodiment of my invention, and as best illustrated in FIGS. 4 and 5, the apertures 36 are each provided with a separate tab or flap 38 which is bent back from the surface of the tail assembly 28. Each of the tabs 38 extends from the generally planar surface of the tail assembly 28 at an acute angle to the surface, preferably at an angle of about 70° or less, in a manner such as to overlap a portion of each aperture 36. The tabs 38 are generally formed in an alternating sequence with one of the tabs 38 extending from one side of the tail assembly 28 with next adjacent tab 38 extending from the other side of the assembly 28 to provide maximum stability of the weight and, thus, to maximize the rotation-free characteristic of the weight 10. However, a variety of flap patterns may be utilized as desired. Additionally, although I prefer to employ a tail assembly 28 with a total of about 17–20 apertures 36 with accompanying tabs 38 aligned generally in straight rows and columns, it will be recognized that a wide variety of alignments and numbers of apertures 36 may be employed depending on factors such as tail assembly size and shape, aperture size and shape, and like factors.

I have found that the tail assembly 28 with apertures 36 formed therein enables my inventive weight 10 to be stable with no substantial tendency to rotate or pivot during a trolling operation thereby substantially reducing the possibility of fishing line entanglement. Additionally, I have found that when tabs 38 are also formed on the tail 28 in conjunction with the apertures 36, the stability of the weight 10 is further enhanced and a fish attracting feature is provided as a result of the minor vibratory or reciprocating action induced in the tail assembly 32 by the action of the water on the tabs 38 as the weight 10 moves through the water. More particularly, the tapered leading edge 32 of body 30 cuts through and divides the water during movement of the weight and the water flows smoothly over the forward tapered section of the body 30 until reaching the generally flattened mid-section 34 which creates a shift in water flow causing the water to rush over the rear tapered section of the body 30 and into contact with the tabs 38 in a relatively turbulent flow. This turbulent rush of water striking the tabs 38 causes the tail assembly 32 to vibrate to a limited extent thereby causing a fish attracting sound wave to be emitted.

I have found that in order to further increase the vibratory action of the tail 28 without adversely affecting the stability of the weight 10, apertures 40 can be formed in the tabs or flaps 38 as shown in FIGS. 2–5. However, although apertures 40 are employed in a preferred embodiment of my invention to further enhance the fish attracting feature of the weights, these tab apertures 40 may be omitted if desired.

While there has been described what is at present considered to be the preferred embodiments of the invention, it is to be understood that modifications may be made therein, and it is intended that the appended claims cover all such modifications which fall within the true spirit and scope of the invention.

I claim:

1. A sinker weight for fishing lines comprising a body member with a tail member affixed thereto, said tail member having a plurality of apertures aligned in a plurality of longitudinally extending rows formed therein whereby pivoting or rotation of said weight during movement of said weight through water during a trolling operation is substantially eliminated.

2. The sinker weight of claim 1 wherein said body member is a solid, generally circular body which in horizontal section tapers to a point at an edge thereof remote from said tail member.

3. The sinker weight of claim 1 including tabs extending from opposite sides of the surface of said tail member in association with said apertures.

4. The sinker weight of claim 2 including tabs extending from opposite sides of said tail member.

5. The sinker weight of claim 4 wherein said body member has a generally biconcave shape in horizontal section tapering from the edges to a flattened midsection.

6. The sinker weight of claim 3 wherein said body member in horizontal section tapers to a point at an edge remote from said tail member and wherein said tabs overlap at least a portion of the associated apertures.

7. A sinker weight for fishing lines comprising a body member with a tail member affixed thereto, said tail member having a plurality of apertures formed therein whereby pivoting or rotation of said weight during movement of said weight through water during a trolling operation is substantially eliminated, and tabs extending from opposite sides of the surface of said tail member in association with said apertures.

8. The sinker weight of claim 7 wherein said tabs extend from said surface of said tail member at acute angles to said surface and overlap at least a portion of the associated apertures.

9. The sinker weight of claim 7 wherein apertures are formed in the surface of said tabs.

10. A sinker weight for fishing lines comprising a body member with a tail member affixed thereto, said tail member having a plurality of apertures formed therein whereby pivoting or rotation of said weight during movement of said weight through water during a trolling operation is substantially eliminated and tabs extending from said tail member, said tabs having apertures formed in the surface thereof.

11. The sinker weight of claim 7 wherein said tabs extend in alternating sequence from said opposite sides of said tail member.

* * * * *